(12) United States Patent
Kodimer et al.

(10) Patent No.: US 9,811,300 B2
(45) Date of Patent: Nov. 7, 2017

(54) DEVICE INVOKED DECOMMISSION OF MULTIFUNCTION PERIPHERALS

(71) Applicants: Toshiba Tec Kabushiki Kaisha, Tokyo (JP); Kabushiki Kaisha Toshiba, Tokyo (JP)

(72) Inventors: Marianne Kodimer, Huntington Beach, CA (US); Silvy Wilson, Rancho Santa Margarita, CA (US)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/291,785

(22) Filed: May 30, 2014

(65) Prior Publication Data

US 2015/0347884 A1    Dec. 3, 2015

(51) Int. Cl.
    *G06F 3/12*    (2006.01)
(52) U.S. Cl.
    CPC ......... *G06F 3/1285* (2013.01); *G06F 3/1203* (2013.01); *G06F 3/123* (2013.01); *G06F 2221/2143* (2013.01)
(58) Field of Classification Search
    USPC ....................................................... 358/1.15
    See application file for complete search history.

(56) References Cited

U.S. PATENT DOCUMENTS

| 2004/0156061 | A1* | 8/2004 | Kobayashi | 358/1.12 |
| 2010/0122319 | A1* | 5/2010 | Nakashima | H04L 63/08 726/2 |
| 2011/0109427 | A1* | 5/2011 | Mihira | H04N 1/00127 340/5.8 |
| 2011/0122439 | A1* | 5/2011 | Sato et al. | 358/1.15 |
| 2012/0133966 | A1* | 5/2012 | Sako | 358/1.13 |
| 2012/0327487 | A1* | 12/2012 | Kamisuwa et al. | 358/527 |
| 2013/0148155 | A1* | 6/2013 | Kitagata | 358/1.15 |

OTHER PUBLICATIONS

IPA (Sep. 19, 2012) http://www.yourcreativesolutions.nl/ICCC13/p/Procurement%20of%20CC%20certified%20Products/Matsutoshi%20Murata%20-%20Details%20of%20new%20MFP-PP%20as%20a%20candidate%20for%20CPP.pdf.*

* cited by examiner

*Primary Examiner* — Huo Long Chen
(74) *Attorney, Agent, or Firm* — SoCal IP Law Group LLP; Jonathan Pearce; Steven C. Sereboff (57) ABSTRACT

Systems and methods for decommission of a multifunction peripheral are disclosed. The method comprises receiving user interaction with the multifunction peripheral initiating a decommission operation for the multifunction peripheral, requesting user input of authentication credentials suitable to enable the decommission operation, and accepting user input of authentication credentials. The method further includes transmitting the authentication credentials, along with a request to enable the decommission operation for the multifunction peripheral to an authentication server for authentication, receiving confirmation that the authentication credentials are sufficient to enable decommission of the multifunction peripheral along with decommission instructions to be executed by the multifunction peripheral, and executing the decommission instructions so as to complete the decommission operation for the multifunction peripheral.

20 Claims, 8 Drawing Sheets

DEVICE INVOKED DECOMMISSION OF MULTIFUNCTION PERIPHERALS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to the decommissioning of multifunction peripherals.

Description of the Related Art

A multifunction peripheral (MFP) is a type of document processing device which is an integrated device providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents, which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document, which the MFP has also scanned, or from an input electronic document, which the MFP has converted to a fax format.

MFPs are often incorporated into corporate or other organization's networks, which also include various other workstations, servers and peripherals. An MFP may also provide remote document processing services to external or network devices.

Decommissioning an MFP has often been a tedious, but necessary process. In particular, the decommission process either required special devices or equipment to commence a decommission. Alternatively, administrative access, either to a local network or to a device itself (set on an MFP-by-MFP basis) was required. While this is done for security, it results in an overly-complicated process.

Still, decommissioning is necessary to ensure that user data stored on the MFP is not inadvertently shared with the next user of an MFP. MFPs today often interact with networks (including passwords and other authentication) and may store either directly or in residual memory copies of copy, scan, print or facsimile jobs that it has previously performed. As a result, decommissioning is an important step that should precede any transfer of an MFP out of a business or other entity that utilizes MFPs.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Decommissioning an MFP directly from the MFP may rely upon user authentication credentials accepted on the MFP but authenticated by a remote server in communication with the MFP. In this way, an individual administrator account associated with a specific MFP is not necessary. Similarly, an administrator device or peripheral is not required in order to unlock the MFP for decommission.

The network server or a related server can also follow the most-recently-updated decommission procedures, based upon settings prescribed by an administrator, based upon the specific firmware installed on the MFP, and best practices provided by the manufacturer or service professional. The decommission processes may be automated in such a way that a native application or series of instructions for steps to be taken by the MFP in the process of decommissioning may be followed by the MFP, once received. That is, the instructions may be on the MFP, transmitted to the MFP or may be predetermined based upon the type of MFP being decommissioned. In addition, predetermined instructions may be augmented by user or organization-specific instructions, for example, provided by an administrator.

Decommission instructions for an MFP may cause, for example, the MFP to delete all stored data on the MFP, to overwrite data storage locations with random data, to delete network passwords and set network configuration settings, and to delete all user-relevant data or configurations such as user logins, user preferences, and any credentials used by a user or associated with a user for accessing other resources (e.g. cloud printing capabilities, network storage locations, network computers, and similar systems).

Description of Apparatus

Figure 1:
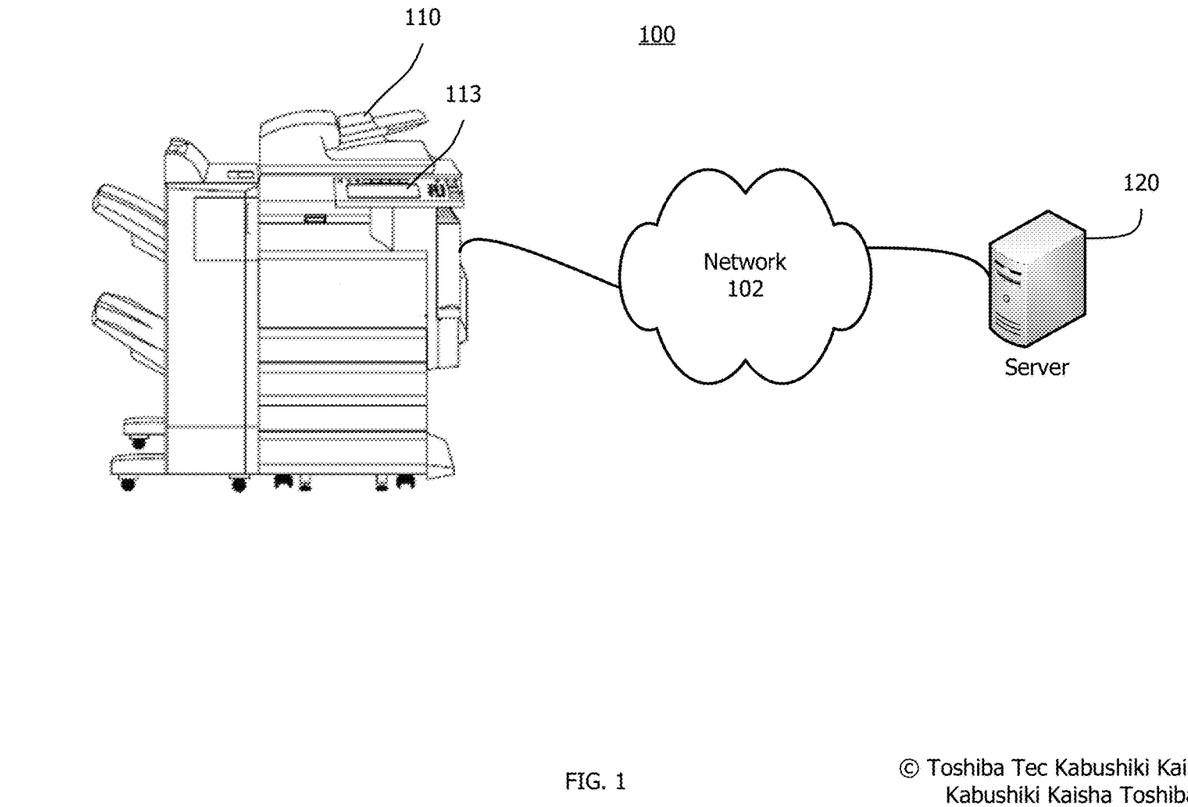
FIG. 1 is a diagram of an MFP system.

Referring now to FIG. 1 there is shown an MFP system 100. The system 100 includes an MFP 110 and a server 120 interconnected by a network 102. The system 100 may be implemented in a distributed computing environment and interconnected by the network 102. An MFP system may include more than one MFP and more than one server.

The network 102 may be a local area network, a wide area network, a personal area network, a mobile or telephone network, the Internet, an intranet, or any combination of these. The network 102 may have physical layers and transport layers according to IEEE 802.11, Ethernet or other wireless or wire-based communication standards and protocols such as WiMAX, Bluetooth®, mobile telephone and data protocols, the public switched telephone network, a proprietary communications network, infrared, and optical.

The MFP 110 may be equipped to receive portable storage media such as USB drives. The MFP 110 includes a user interface subsystem 113, which communicates information to and receives selections from users. The user interface subsystem 113 has a user output device for displaying graphical elements, text data or images to a user and a user input device for receiving user inputs. The user interface subsystem 113 may include a touchscreen, LCD display, touch-panel, alpha-numeric keypad and/or an associated thin client through which a user may interact directly with the MFP 110.

The server 120 is software operating on a server computer connected to the network.

Figure 2:
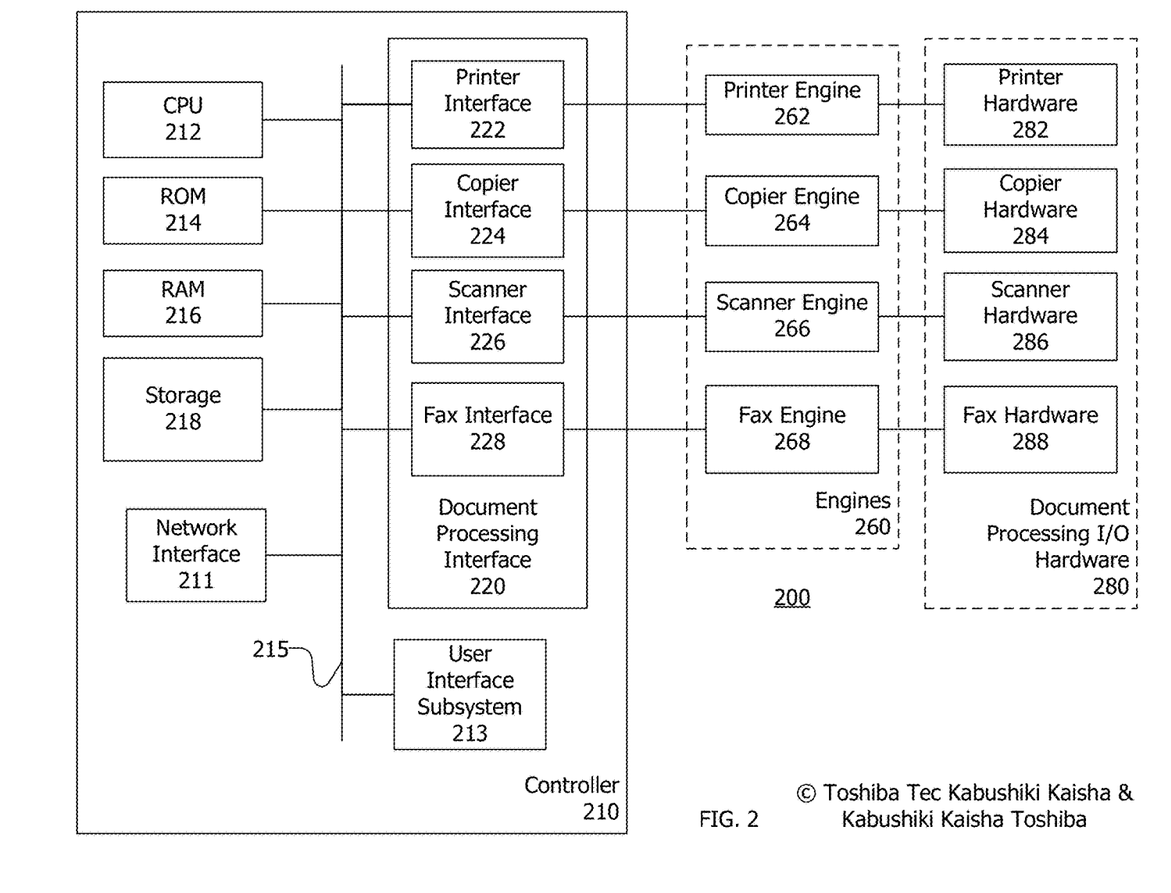
FIG. 2 is a block diagram of an MFP.

Turning now to FIG. 2 there is shown a block diagram of an MFP 200, which may be the MFP 110 (FIG. 1). The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213, which may be the user interface subsystem 113 (FIG. 1).

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
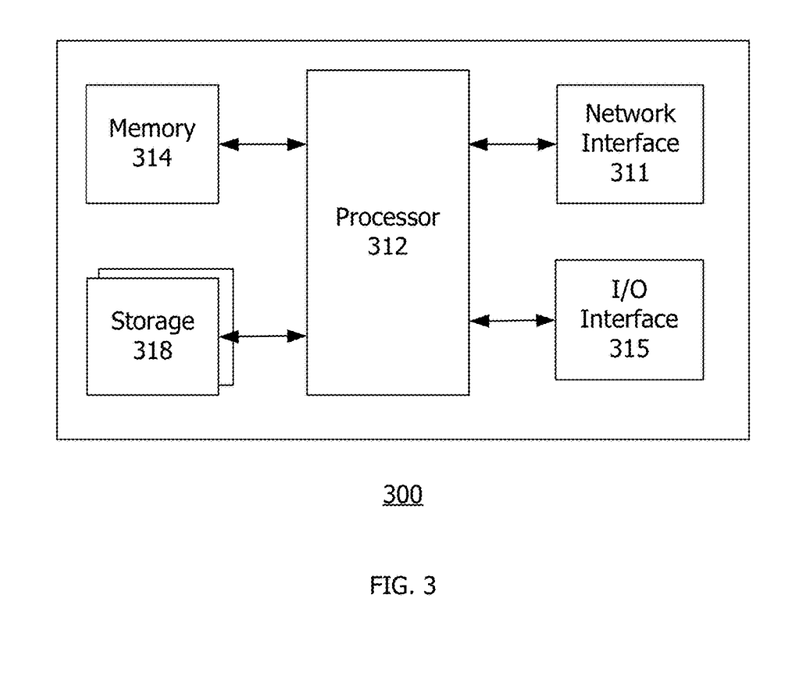
FIG. 3 is a block diagram of a computing device.

Turning now to FIG. 3 there is shown a computing device 300, which is representative of the server computers, client devices, mobile devices and other computing devices discussed herein. The controller 210 (FIG. 2) may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors, application specific integrated circuits (ASICs), or systems on a chip (SOACs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 102 (FIG. 1).

The I/O interface 315 interfaces the processor 312 to peripherals (not shown) such as displays, keyboards and USB devices.

Figure 4:
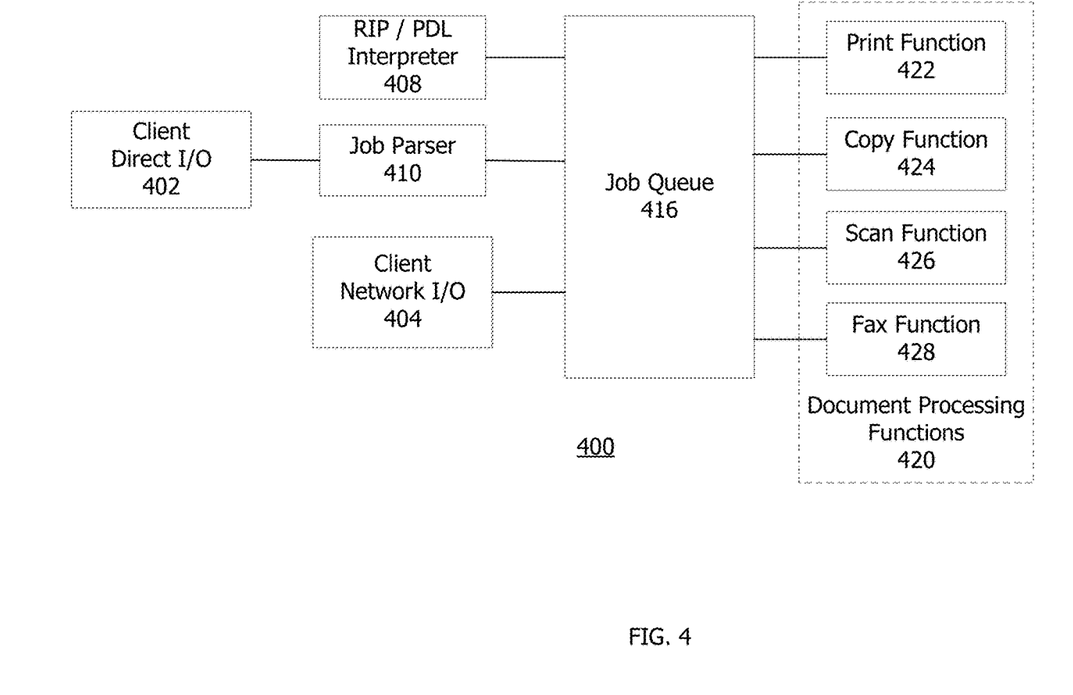
FIG. 4 is a block diagram of a software system for an MFP.

Turning now to FIG. 4 there is shown a block diagram of a software system 400 of an MFP, which may operate on the controller 210. The system 400 includes client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 provide input and output to the MFP controller. The client direct I/O 402 is for the user interface on the MFP (e.g., user interface subsystem 113), and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

Figure 5:
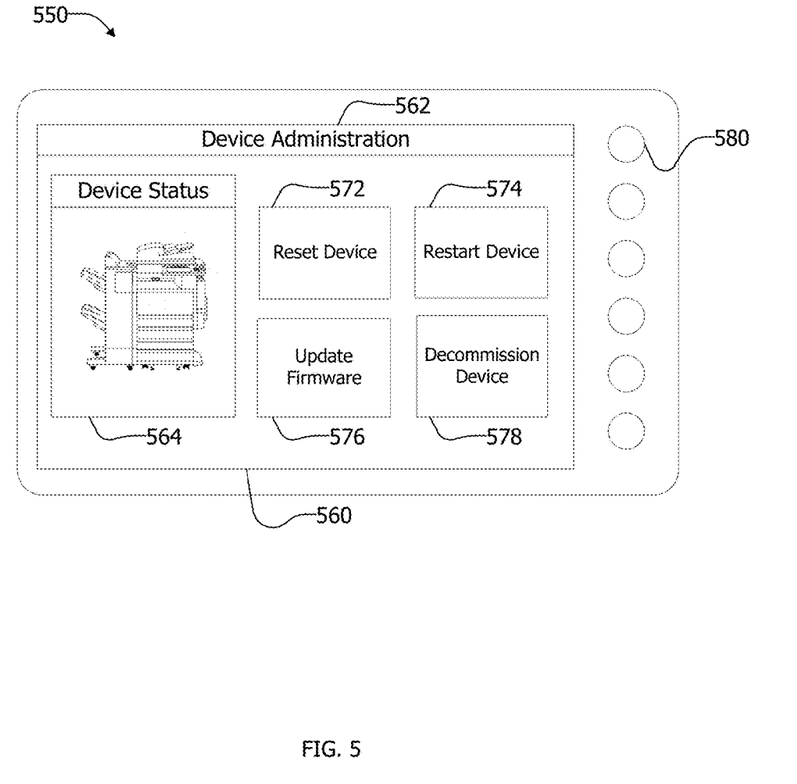
FIG. 5 is an MFP user interface showing device administration operations.

Turning now to FIG. 5, an MFP user interface 550 may allow a user to control administration operations of the MFP. The user interface 550 may include a display 560 and/or a series of function buttons, like function button 580. The display 560 includes the capability to display images to users and may have a touch overlay that enables users to interact with user interface elements shown on the display 560.

This display is showing a title 562 of "device administration." This title 562 may dynamically update dependent upon the portion of the user interface 550 being shown on the display 560. Other functional screen displays may have different titles. The device administration screen on the display 560 may only be available after a user has input relevant administrator credentials or, alternatively, may be available, but require administrator credentials in order to use the functions shown.

The display 560 may include a device status 564 that may include indications of the status of the MFP such as the types of paper in each tray of the MFP, whether the MFP is functional or whether specific functions are available on the MFP. The device status 564 may also include a network address or serial number associated with the MFP.

The display 560 also includes a series of buttons 572, 574, 576, and 578. The reset device button 572 may begin the process of resetting the MFP to a default state or to a previously-stored state. The restart device button 574 may restart the MFP, for example, in the event that new firmware has been installed or the device has become non-responsive for some reason. The restart device button 574 may also enable an administrator to shut down the MFP. The update firmware button 576 may begin the process of obtaining and installing updated firmware, either from a local source such as a USB storage device or a local hard disk drive, or from a remote source such as a server or other MFP.

The decommission device button 578 may be interacted with by a user to initiate a decommission process for the MFP. The decommission process will result in the MFP being ready to be removed from the location. As described above, there may be defined procedures for this process, including intentionally overwriting any data storage on the MFP with random data, removing any network authentication credentials or user authentication credentials that have been input, and deleting any other potentially-sensitive information that may be inadvertently stored on the MFP.

The function buttons, like function button 580 may initiate functions or supplement the functions available through user interaction with the display 560.

Figure 6:
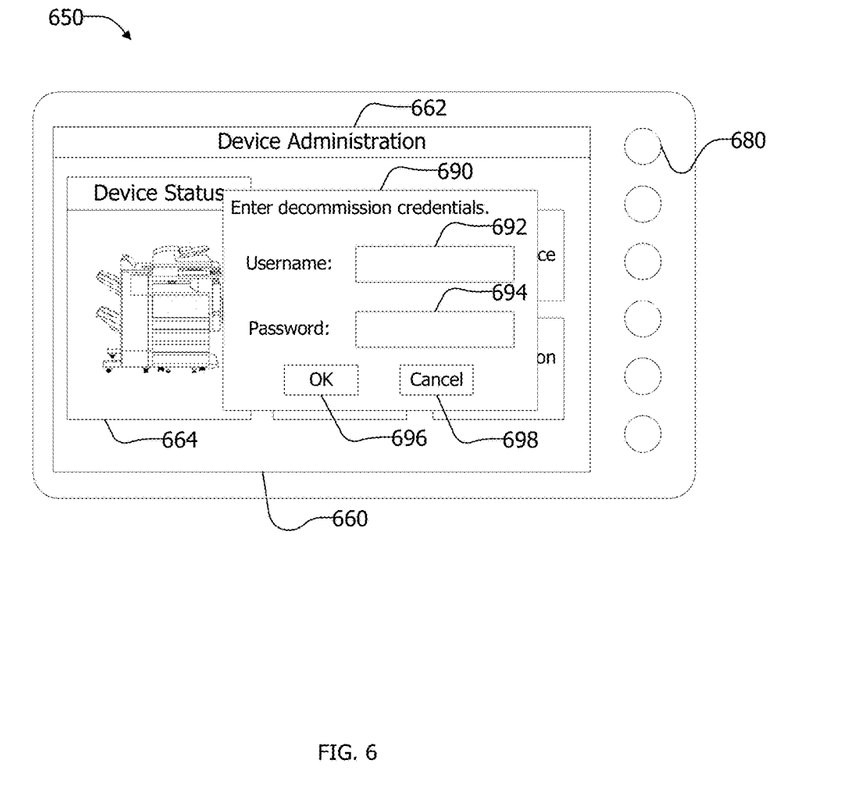
FIG. 6 is an MFP user interface for requesting decommission credentials.

Turning now to FIG. 6, an MFP user interface 650 for requesting decommission credentials is shown. The function of the user interface 650, the device status 664, title 662 and function button 680 are discussed above with respect to FIG. 5 and will not be discussed again here.

The user credential screen 690 is shown. This user credential screen 690 enables the MFP to accept a username in the username text box 692 and a password in the password text box 694. Other types of user credentials may be accepted, for example, an RFID tag in a mobile device, or Bluetooth® interaction with a mobile device, when that mobile device contains suitable administrator user credentials. The MFP may communicate with that mobile device to obtain appropriate credentials automatically.

Once the user has input suitable user credentials, through whatever process, the user may select the OK button 696 to begin the process of confirming the credentials are authorized to complete a decommission process. The user may select the cancel button 698 to cancel the operation.

Figure 7:
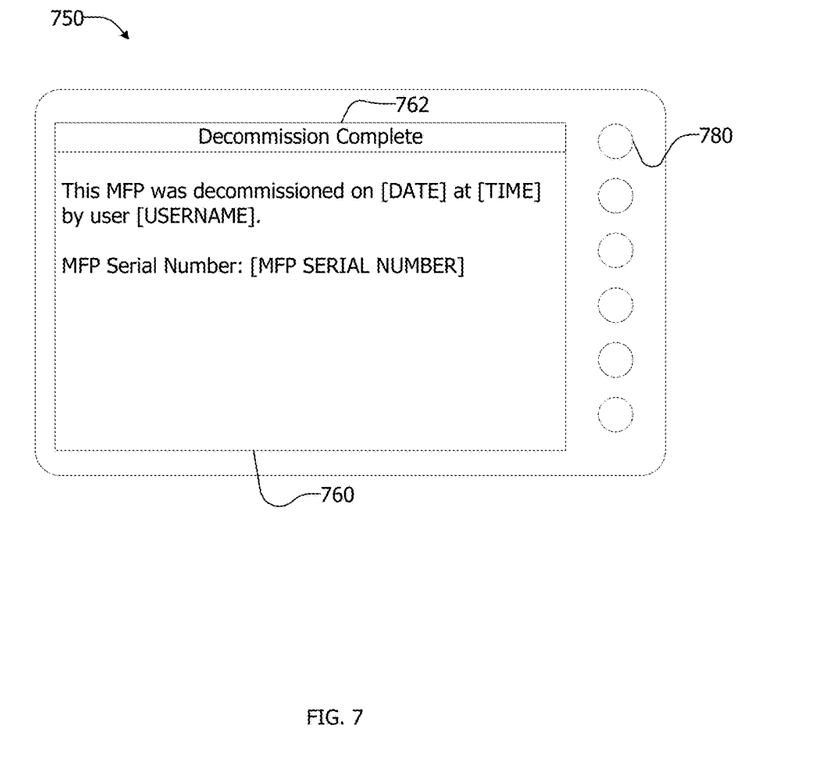
FIG. 7 is an MFP user interface after MFP decommission.

Turning now to FIG. 7, an MFP user interface 750 after MFP decommission is shown. The MFP user interface 750, display 760 and function buttons, like function button 780 are discussed above with respect to FIG. 5. That discussion will not be repeated here.

The title 762 has been updated here to indicate that the decommission is complete. This may be because the MFP may be rendered substantially non-functional for typical MFP operations by the decommission process. As a result, this screen may be the only guidance typical users receive as to why the MFP is not functional, for example, for copy operations.

The display 760 may indicate the date and time that the MFP was decommissioned along with a username (from the credentials input into username text box 692 above) that authorized the decommissioning of the MFP. In this way, users will be made aware that the MFP is unavailable for use. For identification purposes, the MFP serial number may also be displayed. Each of the date, time, username, and MFP are shown in brackets to indicate that the text in brackets may be replaced with actual text corresponding to the appropriate date, time, username and serial number given the situation.

Description of Processes

Figure 8:
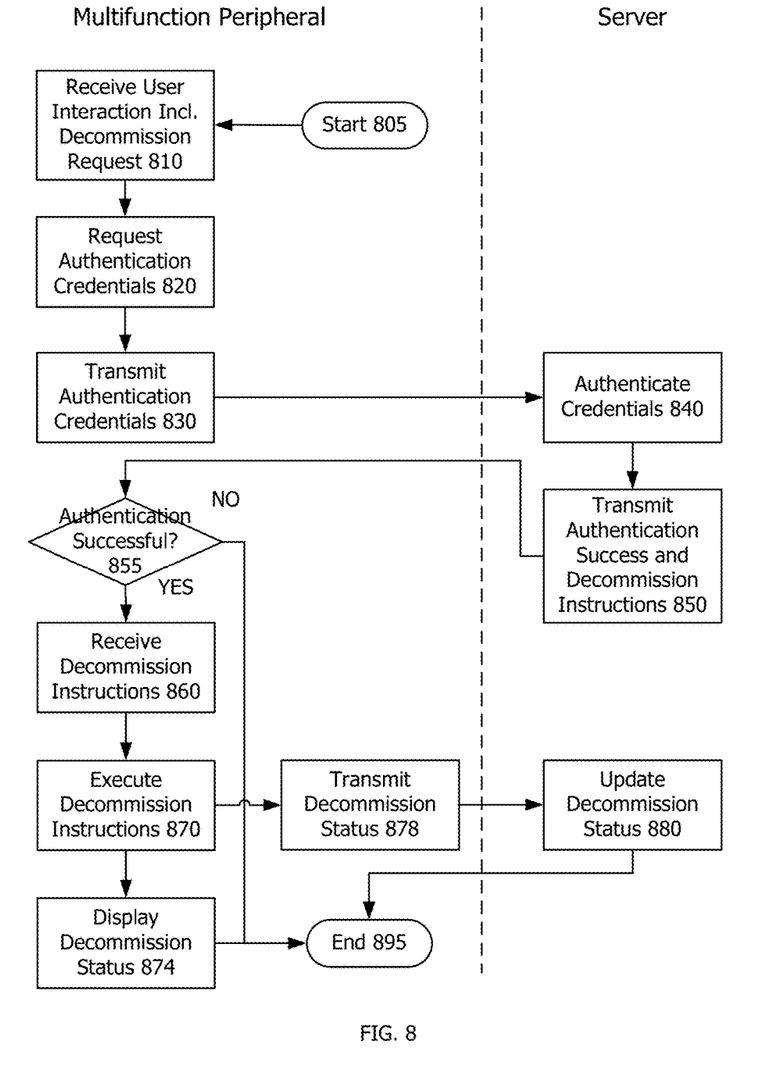
FIG. 8 is a flowchart for the decommission operation of an MFP.

Turning now to FIG. 8, a flowchart for the decommission operation of an MFP is shown. The flowchart begins at start 805 and ends at end 895.

The process begins with receipt of user interaction including a decommission request at 810. This interaction may be, for example, interaction with the decommission device button 578 on an MFP as shown in FIG. 5.

In response to this interaction, the MFP may request authentication credentials at 820. In the case of an MFP, this request may be for a username and password, a suitable RFID key or other data sufficient to authenticate a user as an administrator. Alternatively, the authentication credentials may be associated with a username and password already entered by a user of the MFP in order to even access the decommission request capability shown in FIGS. 5 and 8.

Next, these credentials are transmitted to a server on a network at 830. In the case of the MFP, the user-input credentials may be transmitted from the MFP, via a network, to a remote server.

The server identified here may be a part of a "cloud" service including one or more servers that maintains regular communication with one or more MFPs associated with one or more user credentials. As such, administrative access to the MFP may be governed by those users associated with those MFPs, rather than being individual users or authentication systems on each individual MFP. In this way, new users (or administrators) may be added and removed from a single list, stored on that server or servers, that identifies all individuals with the authorization to decommission an MFP.

Still further, the service, operated by a manufacturer, may maintain a separate list of its own support technicians who always retain administrator access to an MFP or to a group of MFPs that they are designated to service. In this way, its support technicians may have access, as needed, to decommission or otherwise interact with any MFP serviced by them.

Once the authentication credentials have been transmitted at 830, they are authenticated at 840, for example by one or more servers. This server or these servers, as discussed above, may be a part of a so-called "cloud" service. Alternatively, this server or these servers may be servers operated by the purchaser of one or more MFPs.

The results of the authentication are transmitted back to the MFP from which the decommission request began along with decommission instructions at 850. These decommission instructions may include a set of procedures, set by an administrator, the organization, or a manufacturer of the MFP for decommissioning the MFP.

At 855, a determination may be made whether or not the authentication performed at 850 was successful. If the authentication was not successful ("no" at 855), the process may end at 895. If the authentication was successful ("yes" at 855), the decommission instructions are received at 860. These decommission instructions may be particular to the MFP brand, model and/or firmware version.

Once the decommission instructions are received, the instructions are executed at 870 in order to decommission the MFP. Substantially simultaneously, the display on the MFP is updated to display the decommission status at 874 while the decommission status is transmitted to the server at 878. The server may then update a database of associated MFPs to indicate the status of the relevant MFP as decommissioned at 880.

For example, the MFP may appear in an administrator's screen as a part of a group of MFPs that are used by an organization. The newly-decommissioned MFP's status may be changed from summary of MFP serial number, network location, physical location, network name, and other data to merely indicating that the relevant MFP is decommissioned. The update may also indicate, as shown on the MFP user interface 750, the time and date of the decommission along with the username of the individual who authorized the decommission process.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to It is claimed:

1. A method for decommission of a multifunction peripheral comprising:
   receiving user interaction initiating a decommission operation for the multifunction peripheral;
   requesting user input of authentication credentials suitable to enable the decommission operation;
   accepting user input of authentication credentials;
   simultaneously transmitting to an authentication server both the authentication credentials and a request for decommission instructions executable by the multifunction peripheral to perform the decommission operation for the multifunction peripheral;
   simultaneously receiving, from the authentication server, both conformation that the authentication credentials are sufficient to enable decommission of the multifunction peripheral and the decommission instructions, not previously present on the multifunction peripheral, to be executed by the multifunction peripheral;
   executing the decommission instructions so as to complete the decommission operation for the multifunction peripheral; and
   transmitting a confirmation of decommission to the authentication server from which an interaction initiating the decommission operation was received including information identifying a user associated with the authentication credentials and an identification of the multifunction peripheral.

2. The method of claim 1 further comprising transmitting data pertaining to the completed decommission operation for the multifunction peripheral to a server.

3. The method of claim 1 wherein the authentication credentials are a user account and password associated with a management system for a plurality of multifunction peripherals, the management system accessible to the authentication server.

4. The method of claim 1 wherein the authentication credentials are input on the multifunction peripheral.

5. The method of claim 1 further comprising updating a remote database incorporating the present status of a plurality of multifunction peripherals including the multifunction peripheral to indicate that the multifunction peripheral has been decommissioned, the date and time of the decommission and the authentication credentials used to authorize the decommission process.

6. The method of claim 1 wherein the decommission instructions comprise a set of procedures, not present on the multifunction peripheral prior to their receipt from the authentication server, for completing the decommission operation on the multifunction peripheral.

7. The method of claim 6 wherein the decommission instructions include a procedure suitable only for multifunction peripherals of a particular model of which the multifunction peripheral is one.

8. A multifunction peripheral, including a processor and associated memory, the multifunction peripheral including software that when executed by the processor causes the processor to:
   receive user interaction initiating a decommission operation for the multifunction peripheral;
   request user input of authentication credentials suitable to enable the decommission operation;
   accept user input of authentication credentials;
   simultaneously transmit to an authentication server both the authentication credentials and a request for decommission instructions executable by the multifunction peripheral to perform the decommission operation for the multifunction peripheral;
   simultaneously receive, from the authentication server, both confirmation that the authentication credentials are sufficient to enable decommission of the multifunction peripheral and the decommission instructions, not previously present on the multifunction peripheral, to be executed by the multifunction peripheral; and
   execute the decommission instructions so as to complete the decommission operation for the multifunction peripheral; and
   transmit a confirmation of decommission to the authentication server from which an interaction initiating the decommission operation was received including information identifying a user associated with the authentication credentials and an identification of the multifunction peripheral.

9. The apparatus of claim 8 wherein the software, when executed by the processor, causes the processor to transmit data pertaining to the completed decommission operation for the multifunction peripheral to a server.

10. The apparatus of claim 8 wherein the authentication credentials are a user account and password associated with a management system for a plurality of multifunction peripherals, the management system accessible to the authentication server.

11. The apparatus of claim 8 wherein the authentication credentials are input on the multifunction peripheral.

12. The apparatus of claim 8 wherein the software, when executed by the processor, causes the processor to update a remote database incorporating the present status of a plurality of multifunction peripherals including the multifunction peripheral to indicate that the multifunction peripheral has been decommissioned, the date and time of the decommission and the authentication credentials used to authorize the decommission process.

13. The apparatus of claim 8 wherein the decommission instructions comprise a set of procedures, not present on the multifunction peripheral prior to their receipt from the authentication server, for completing the decommission operation on the multifunction peripheral.

14. A system comprising a multifunction peripheral, the multifunction peripheral comprising:
   a first network interface for simultaneously receiving from an authentication server, both confirmation that the received authentication credentials are sufficient to enable decommission of the multifunction peripheral and the decommission instructions to be executed by the multifunction peripheral and not previously present on the multifunction peripheral to be executed by the multifunction peripheral to cause the multifunction peripheral to be decommissioned, and, once a decommission operation is complete, for transmitting a confirmation of decommission to the authentication server device from which an interaction initiating the decommission operation was received including information identifying a user associated with the authentication credentials and an identification of the multifunction peripheral; and
   a processor for executing a decommission instructions so as to complete the decommission operation for the multifunction peripheral.

15. The system of claim 14 wherein the first network interface is further for transmitting data pertaining to the completed decommission operation for the multifunction peripheral to a server.

16. The system of claim 14 wherein the authentication credentials are a user account and password associated with a management system for a plurality of multifunction peripherals, the management system accessible to the authentication server.

17. The system of claim 14 wherein the first network interface is further for updating a remote database incorporating the present status of a plurality of multifunction peripherals including the multifunction peripheral to indicate that the multifunction peripheral has been decommissioned, the date and time of the decommission and the authentication credentials used to authorize the decommission process.

18. The system of claim 14 further comprising a second network interface for transmitting user input authentication credentials, along with a request to enable the decommission operation for the multifunction peripheral to an authentication server for authentication.

19. The system of claim 14 wherein the decommission instructions comprise a set of procedures, not present on the multifunction peripheral prior to their receipt from the authentication server, for completing the decommission operation on the multifunction peripheral.

20. The system of claim 19 wherein the decommission instructions include a procedure suitable only for multifunction peripherals of a particular model of which the multifunction peripheral is one.

* * * * *